(12) United States Patent
Kay et al.

(10) Patent No.: US 9,162,611 B2
(45) Date of Patent: Oct. 20, 2015

(54) SOLID STATE STEERABLE LIGHT

(75) Inventors: Bradley William Kay, Mequon, WI (US); Kevin Jay McWithey, Fond du Lac, WI (US)

(73) Assignee: J.W. Speaker, Corporation, Germantown, WI (US)

( * ) Notice: Subject to any disclaimer, the term of this patent is extended or adjusted under 35 U.S.C. 154(b) by 822 days.

(21) Appl. No.: 13/342,573

(22) Filed: Jan. 3, 2012

(65) Prior Publication Data
US 2013/0169154 A1    Jul. 4, 2013

(51) Int. Cl.
*B60Q 1/12*    (2006.01)
*B60Q 1/14*    (2006.01)
*F21S 8/10*    (2006.01)

(52) U.S. Cl.
CPC *B60Q 1/143* (2013.01); *B60Q 1/12* (2013.01); *F21S 48/1154* (2013.01); *F21S 48/1747* (2013.01); *B60Q 2300/056* (2013.01); *B60Q 2300/42* (2013.01)

(58) Field of Classification Search
USPC .............................. 315/76–84; 362/459–549
See application file for complete search history.

(56) References Cited

U.S. PATENT DOCUMENTS

| | | | |
|---|---|---|---|
| 4,891,559 A | 1/1990 | Matsumoto et al. | |
| 6,176,590 B1 | 1/2001 | Prevost et al. | |
| 7,156,542 B2 | 1/2007 | Miller et al. | |
| 7,653,215 B2 | 1/2010 | Stam | |
| 7,690,826 B2 | 4/2010 | Kim | |
| 8,080,942 B2 * | 12/2011 | Heider et al. | 315/77 |
| 2006/0007697 A1 | 1/2006 | Ackermann | |
| 2006/0023461 A1 | 2/2006 | Knight | |
| 2007/0195270 A1 | 8/2007 | Hull et al. | |
| 2010/0232173 A1 | 9/2010 | Ohno et al. | |
| 2011/0169410 A1 | 7/2011 | Dassanayake et al. | |
| 2011/0210666 A1 | 9/2011 | Shiao et al. | |
| 2011/0210667 A1 | 9/2011 | Shiao et al. | |
| 2011/0211359 A1 | 9/2011 | Shiao et al. | |

FOREIGN PATENT DOCUMENTS

| | | |
|---|---|---|
| DE | 10300771 A1 | 5/2004 |
| DE | 102005003656 A1 | 9/2005 |
| DE | 102006039182 A1 | 3/2008 |
| DE | 102007050220 A1 | 5/2008 |
| DE | 102010037210 A1 | 5/2011 |
| EP | 2221219 | 8/2010 |
| WO | 2011114270 A1 | 9/2011 |

* cited by examiner

*Primary Examiner* — Douglas W Owens
*Assistant Examiner* — Jonathan Cooper
(74) *Attorney, Agent, or Firm* — Quarles & Brady LLP

(57) ABSTRACT

A light assembly and method for generating a light pattern, the assembly comprising a first light module including a first LED array, the first LED array including at least a first line of LEDs where each LED in the first array generates an LED light pattern and where dark areas occur between adjacent LED light patterns, the first LED array forming a first light pattern including interleaved bright and dark areas and a second light module wherein the first and second light modules are arranged with the first light pattern misaligned with a second light pattern generated by the second light module so that at least a subset of the bright areas in the first light pattern are aligned with dark areas in the second light pattern to generate a combined light pattern.

16 Claims, 18 Drawing Sheets

(a)

(b)

(a)

(b)

(a)

(b)

(a)

(b)

(a)

(b)

SOLID STATE STEERABLE LIGHT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to steerable or adaptive lighting assemblies and more specifically to solid state adaptive assemblies for directing light to different locations without physically moving lighting components.

Conventional headlights on a vehicle generate a light pattern that is directed forward to light the space in front of the vehicle during forward motion and work well when a vehicle is traveling along a straight line in the forward direction. The lighting profile in these cases often has a relatively bright light spot in the center of a wider light pattern to illuminate a long distance directly in front of the vehicle where a driver's line of sight is most often directed. When a vehicle is turning, a driver's line of sight is typically along the direction of the turn and therefore not aligned with the bright light spot in the center of the wider light pattern. Thus, while the bright spot is useful when the vehicle is travelling directly forward, the bright spot does not enhance a driver's ability to perceive danger when executing a turn.

Some headlights have been developed that include steerable lighting modules where a bright spot can be swiveled left or right to align with the direction of vehicle travel when a vehicle is travelling directly forward or when the vehicle is turning. For instance, some lights have been developed that include light modules that are mounted for rotation about a vertical axis through a range that enables the modules to direct light patterns generally along directions selected by a vehicle steering system. Thus, when a steering system turns to the left, the light modules are rotated to the left to a similar degree and when the steering system turns to the right, the light modules are rotated to the right to a similar degree.

Lights having mechanically rotating modules have two shortcomings. First, these systems require several moving parts and therefore are relatively expensive to implement. Second, because these systems include moving mechanical parts, they often require more maintenance than a conventional headlight and therefore are more expensive to maintain.

Some solid state steerable headlights have been developed that address the problems related to mechanically rotating modules. For instance, it is known to provide a one or two dimensional array of LEDs where the LEDs generate separate adjacent light fields and where different subsets of the LEDs may be illuminated to generate light patterns at different locations in front of a vehicle. For instance, in a simple example including fifteen LEDs in a row from left to right, where the first three LEDs to the left are on and the others are off, the light pattern would appear generally to the left, where the last three LEDs to the right are on and the others are off, the light pattern would appear generally to the right, and other pattern locations between the far left and far right locations would result from turning on other subsets of LEDs with the balance of the LEDs off.

While solid state steerable lights may be less costly to manufacture and have fewer maintenance problems than lights including mechanically rotatable modules, solid state lights also have several shortcomings. First, as well known in the LED lighting arts, even when LEDs are mounted closely to each other, there are dark spots between adjacent LEDs that result in dark spots or lines between the illumination fields generated by adjacent LEDs where the illumination level is noticeably lower than within the illumination fields. Dark lines in an illumination pattern are annoying to drivers, especially during turns where the dark lines are moving with respect to a scene being viewed by the driver during execution of a turn.

Second, as LEDs in an array are turned on and off to simulate mechanical rotation of a light module during a turn, the turning on and off action of the LEDs is relatively abrupt so that a driver perceives the different LED illumination fields being turned on and off in a stepwise fashion. Here, while the illumination pattern is clearly moving, the movement is stepped as opposed to being smooth and is often annoying to a driver.

BRIEF SUMMARY OF THE INVENTION

It has been recognized that two or more light modules can be provided where each module includes a separate array or bank of LEDs and where the modules are arranged so that illumination fields of the LEDs in the different modules overlap such the dark lines between illumination fields associated with adjacent LEDs in one array are illuminated by illumination fields generated by LEDs in at least one of the other arrays. In this manner, the annoying dark lines associated with prior LED based steerable headlights are eliminated.

It has also been recognized that during the process of steering an illumination pattern from one position or trajectory to another position or trajectory, the illusion of smooth movement of the illumination pattern can be enhanced by changing the duty cycles of LEDs in a controlled fashion. For example, the duty cycles of LEDs can be controlled so that light intensity along an edge of the resulting illumination pattern in the direction of pattern movement increases gradually while light intensity along an edge of the pattern in the direction opposite pattern movement decreases gradually. In this fashion, the perceived stepped changes in light pattern perceived in prior light systems can be substantially eliminated.

Consistent with the comments above, at least some embodiments of the present invention include a light assembly for generating a light pattern, the assembly comprising a first light module including a first LED array and a first lens, the first LED array including at least a first line of LEDs where each LED in the first array generates an LED light pattern and where dark areas occur between adjacent LED light patterns, the first lens arranged adjacent the first LED array to project light from the first LED array forming a first light pattern including interleaved bright and dark areas corresponding to the LED light patterns and dark areas between the light patterns that are associated with the first LED array and a second light module including a second LED array and a second lens, the second LED array including at least a second line of LEDs where each LED in the second array generates an LED light pattern and where dark areas occur between adjacent LED light patterns, the second lens arranged adjacent the second LED array to project light from the second LED array forming a second light pattern including interleaved bright and dark areas corresponding to the LED light patterns and dark areas between the light patterns that are associated with the second LED array, wherein the first and second light modules are arranged with the first light pattern misaligned with the second light pattern so that at least a subset of the bright areas in the first light pattern are aligned with dark areas in the second light pattern to generate a combined light pattern.

In some cases the system further includes a processor for controlling the LEDs in the first and second LED arrays, the processor receiving a control signal and using the control signal to turn LEDs in the first and second arrays on and off to adjust the angles of light projected by the first and second lenses. In some cases the processor controls the LEDs in the first LED array differently than the processor controls the LEDs in the second LED array. In some cases no more than three LEDs in the first and second LED arrays are on at one time. In some cases the system further includes a processor for controlling the LEDs in the first and second LED arrays, the processor receiving a control signal and using the control signal to adjust intensity of the LEDs in the first and second arrays to adjust the direction of the combined light pattern emanating from the lenses.

In some embodiments the processor controls intensity of the LEDs via a pulse width modulation process. In some cases at least one LED in at least one of the first and second LED arrays is driven at a maximum intensity at all times. In some cases when at least one LED in one of the first and second LED arrays is driven with a high intensity to generate a relatively high intensity area in the combined pattern, LEDs in the other of the first and second LED arrays that illuminate areas in the combined pattern on either side of the high intensity area are driven with a lower intensity that is lower than the high intensity to generate lower intensity areas adjacent the high intensity areas in the combined pattern.

In some embodiments the combined light pattern can be adjusted within a range of positions from a first position wherein a single LED at a first end of each of the first and second light modules is driven with a high intensity and at least a subset of the other LEDs in the light modules are off and a last position wherein a single LED at a second end of each of the first and second light modules is driven with a high intensity and at least a subset of the other LEDs in the light modules are off. In some cases when the combined light pattern is at a position between the first and last positions, only a subset of the LEDs in each light module is on and at least a subset of the LEDs that are on are driven with a duty cycle that is less than a maximum duty cycle.

In some embodiments no more than three LEDs in the first and second light modules are driven at any time. In some embodiments only one LED in the first and second light modules is driven at a maximum duty cycle and only two LEDs in the first and second light modules are driven at less than the maximum duty cycle. In some cases the two LEDs that are driven at less than the maximum duty cycle generate illumination fields that at least partially overlap the illumination fields generated by the LED that is driven at the maximum duty cycle.

In some embodiments the assembly is a first assembly and the combined light pattern is a first combined light pattern and where the first assembly is for use with a second assembly to form a pair of headlights on a vehicle wherein the second assembly generates a second combined light pattern that mirrors the first combined light pattern, the first and second assemblies arranged so that the first and second combined light patterns are substantially aligned and combine to generate a headlight pattern. In some cases the LED lines are substantially horizontal and wherein the first and second light modules form a headlight for a vehicle. In some cases the LED lines are substantially vertical and wherein the first and second light modules form a light for use on a lift truck. In some embodiments each of the first and second lines of LEDs includes first through fifth LEDs and wherein the processor controls the intensities of each LED.

Other embodiments include a light assembly for generating a light pattern, the assembly comprising a first light module including a first LED array and a first lens, the first LED array including at least a first line of LEDs where each LED in the first array generates an LED light pattern, the first lens arranged adjacent the first LED array to project light from the first LED array forming a first light pattern including separate adjacent illumination fields corresponding to each LED in the first LED array and a second light module including a second LED array and a second lens, the second LED array including at least a second line of LEDs where each LED in the second array generates an LED light pattern, the second lens arranged adjacent the second LED array to project light from the second LED array forming a second light pattern including separate adjacent illumination fields corresponding to each LED in the second LED array, wherein the first and second light modules are arranged with the first light pattern misaligned with the second light pattern so that at least a subset of the illumination fields in the first light pattern overlap at least two illumination fields in the second light pattern to generate a combined light pattern.

In some embodiments the first and second light modules are arranged with the first and second light patterns misaligned so that at least one illumination field in the first light pattern overlaps each two adjacent illumination fields in the second light pattern and at least one illumination field in the second light pattern overlaps each two adjacent illumination fields in the first light pattern.

Yet other embodiments include a light assembly for generating a light pattern, the assembly comprising a plurality of LEDs mounted in a line, at least a first lens positioned in front of the LEDs to direct light from each LED into an illumination field associated with the LED wherein the illumination fields of energized LEDs together create an illumination pattern and wherein a first edge illumination field is at one end of the illumination pattern and a second edge illumination field is at another end of the illumination pattern opposite the one end and a processor controlling the LED duty cycles to move the illumination pattern projected by the at least a first lens in a first direction to the side of the first edge illumination field opposite the second edge illumination field by (i) increasing the duty cycle of an LED associated with the first edge illumination field while simultaneously decreasing the duty cycle of an LED associated with the second edge illumination field until the duty cycles of the LEDs associated with the first and second edge illumination fields are maximum and minimum duty cycles, respectively and (ii) repeating step (i) with the illumination field adjacent the first edge illumination field in the first direction as the first edge illumination field and with the illumination field adjacent the second edge illumination field in the first direction as the second edge illumination field the maximum and minimum duty cycles are 100% and 0% duty cycles at least one LED is driven with 100% duty cycle at any time only three LEDs in the plurality of LEDs are driven at a non-zero duty cycle at any time.

In some embodiments the processor is also for controlling the LED duty cycles to move the illumination pattern projected by the lens in a second direction to the side of the second edge illumination field opposite the first edge illumination field by (iii) increasing the duty cycle of an LED associated with the second edge illumination field while simultaneously decreasing the duty cycle of an LED associated with the first edge illumination field until the duty cycles of the LEDs associated with the second and first edge illumination fields are maximum and minimum duty cycles, respectively and (iv) repeating step (iii) with the illumination field adjacent the second edge illumination field in the second direction as the second edge illumination field and with the illumination field adjacent the first edge illumination field in the second direction as the first edge illumination field.

In some cases the plurality of LEDs includes first and second banks of LEDs arranged in a line and wherein the at least a first lens includes first and second lenses where the first lens is positioned in front of the first bank of LEDs to direct light from each LED in the first bank into an illumination field associated with the LED and the second lens is positioned in front of the second bank of LEDs to direct light from each LED in the second bank into an illumination field associated with the LED wherein the illumination fields of energized LEDs in the first and second banks together create the illumination pattern and wherein a separate illumination field associated with the first bank LEDs overlaps each two adjacent illumination fields associated with the second bank while a separate illumination field associated with the second bank LEDs overlaps each two adjacent illumination fields associated with the first bank. In some embodiments no more than two LEDs in the first and second LED banks are driven at partial duty cycles at one time.

Some embodiments include a method for smoothly moving a light pattern across a space, the method for use with a plurality of LEDs mounted in a line and at least a first lens positioned in front of the LEDs to direct light from each LED into an illumination field associated with the LED wherein the illumination fields of energized LEDs together create an illumination pattern and wherein a first edge illumination field is at one end of the illumination pattern and a second edge illumination field is at another end of the illumination pattern opposite the one end, the method comprising the steps of providing a processor programmed to perform the steps of, controlling LED duty cycles to move the illumination pattern projected by the at least a first lens in a first direction to the side of the first edge illumination field opposite the second edge illumination field by (i) increasing the duty cycle of an LED associated with the first edge illumination field while simultaneously decreasing the duty cycle of an LED associated with the second edge illumination field until the duty cycles of the LEDs associated with the first and second edge illumination fields are maximum and minimum duty cycles, respectively, and (ii) repeating step (i) with the illumination field adjacent the first edge illumination field in the first direction as the first edge illumination field and with the illumination field adjacent the second edge illumination field in the first direction as the second edge illumination field.

Other embodiments include a method for steering a vehicle headlight illumination pattern wherein a headlight includes a plurality of LEDs arranged in a line and at least a first lens mounted adjacent the LEDs to direct light from each LED into an illumination field associated with the LED, wherein the illumination fields of energized LEDs together create an illumination pattern and wherein a first edge illumination field is at one end of the illumination pattern and a second edge illumination field is at another end of the illumination pattern opposite the one end, the method comprising the steps of providing a processor programmed to perform the steps of, illuminating a subset of consecutive LEDs in the line including LEDs associated with the first and second edge illumination fields, as the direction of vehicle wheels changes (i) fading the LED associated with one of the first and second illumination fields off while simultaneously fading the LED associated with the other of the first and second illumination fields on thereby changing the illumination pattern and (ii) repeating step (i) so that the illumination pattern tracks the direction of the vehicle wheels.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE INVENTION

Figure 1:
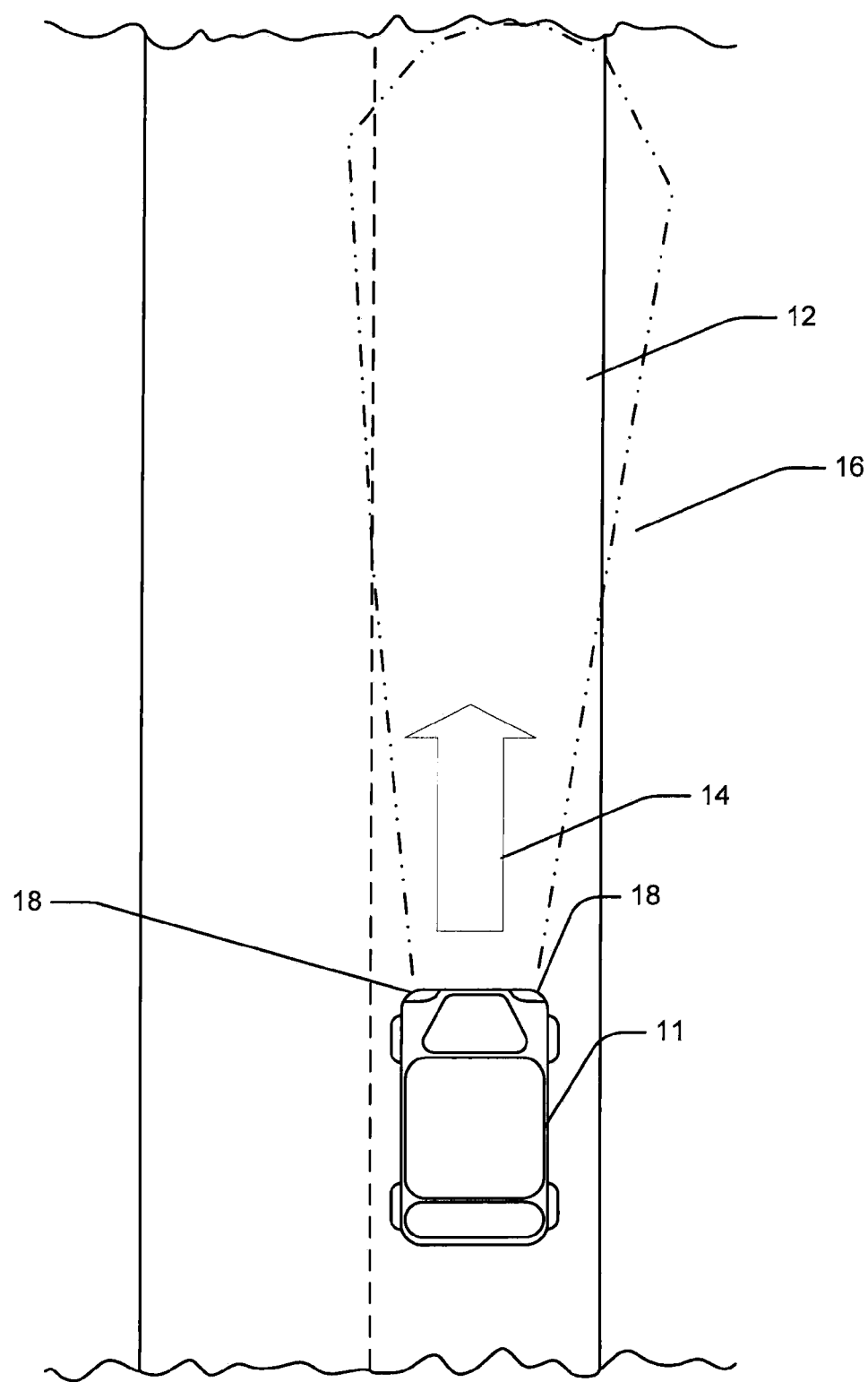
FIG. 1 is a top plan view of a vehicle in a right lane of a road and shows an illumination pattern generated by vehicle headlights.

Referring now to the drawings wherein like reference numerals correspond to similar elements throughout the several views and, more specifically, referring to FIG. 1, a top plan view of a vehicle 11 traveling within a lane 12 on a road is illustrated where the vehicle 11 is traveling in a direction indicated by arrow 14. Vehicle 11 includes two headlights 18 that generate light forming a light pattern identified by numeral 16.

Figure 2:
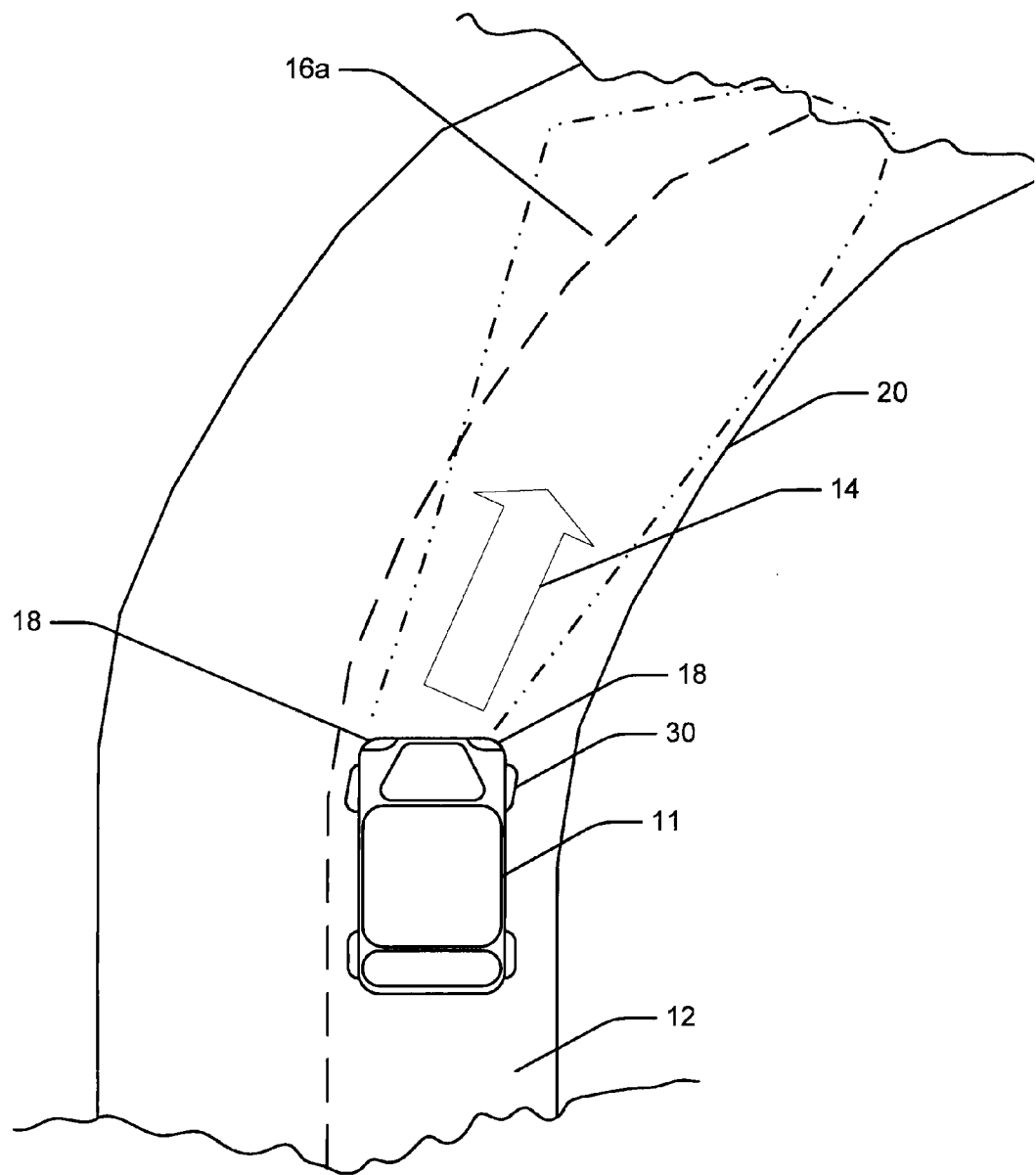
FIG. 2 is similar to FIG. 1, albeit showing a vehicle turning about a right-hand curve and a different illumination pattern in front of the vehicle.

Referring to FIG. 2, in general the disclosure describes an adaptive or steerable headlight system for a vehicle 11 where, as the vehicle 11 is turning about a curve, the light pattern (see 16a in FIG. 2) adjusts or is steered to provide additional light to illuminate the area toward which the vehicle is traveling. Thus, for instance, in FIG. 2 where the front steering tires 30 of vehicle 11 are directed about a curve 20 in lane 12, (see arrow 14 that shows the direction of tires 30), headlights 18 are controlled to generate light pattern 16a that illuminates the area to which vehicle 11 is traveling.

Figure 3:
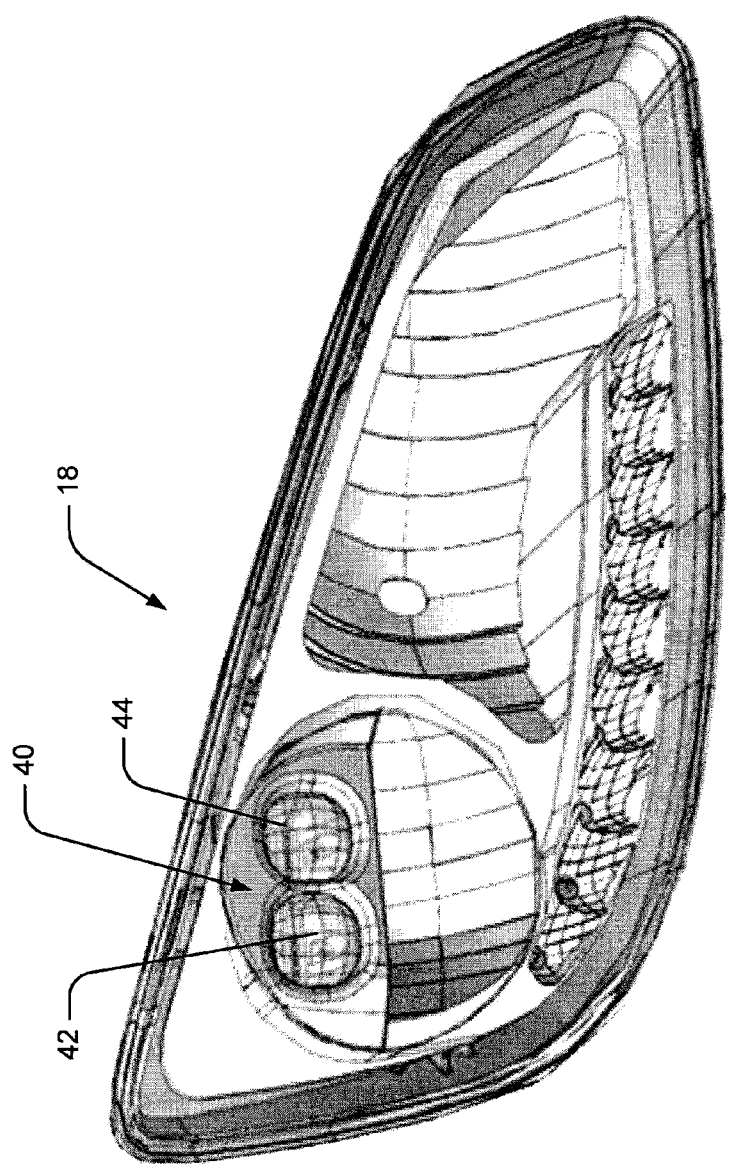
FIG. 3 is a perspective view of a headlight that is consistent with at least some aspects of the present invention.
Figure 4:
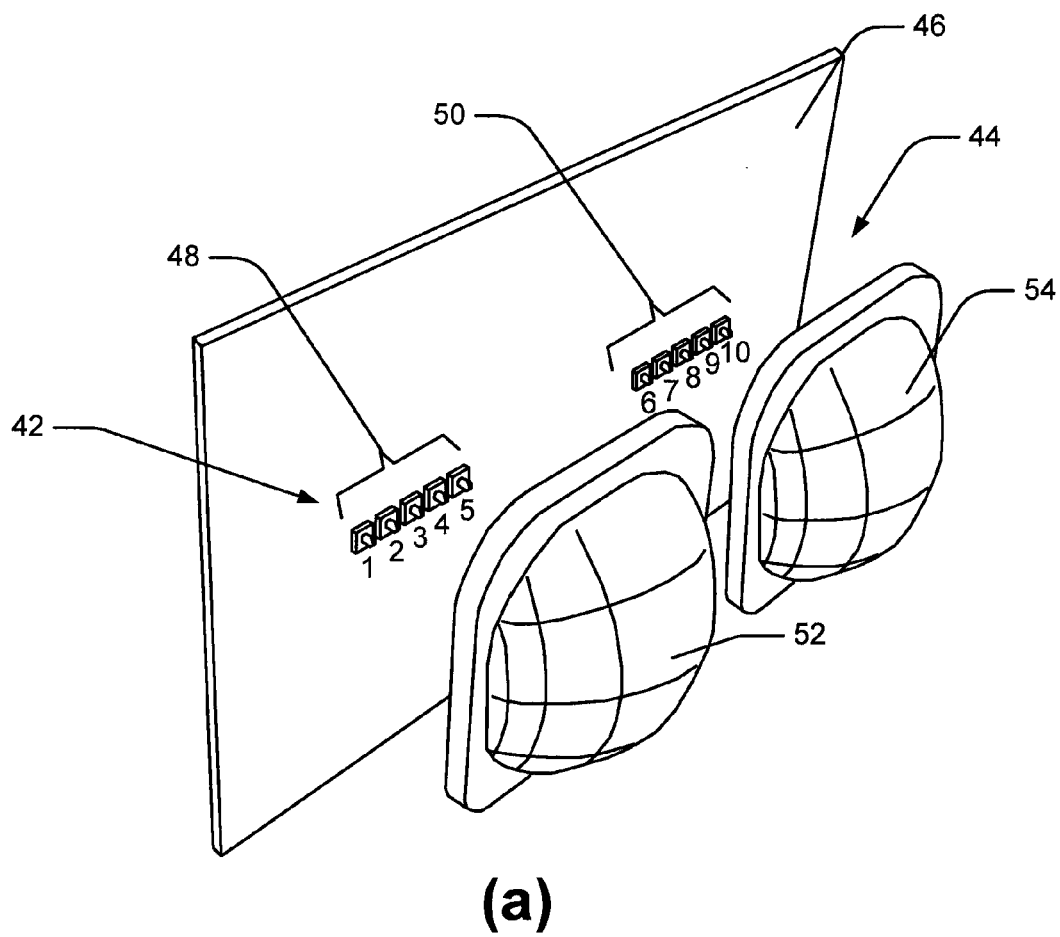
FIG. 4(a) is a partially exploded view showing lenses and LED banks that form first and second light modules of FIG. 3
FIG. 4(b) is a partial cross-sectional view showing the lenses and LED banks of FIG. 4(a) as well as a virtual location of a seventh LED in the LED banks relative to the first LED bank.
Figure 4:
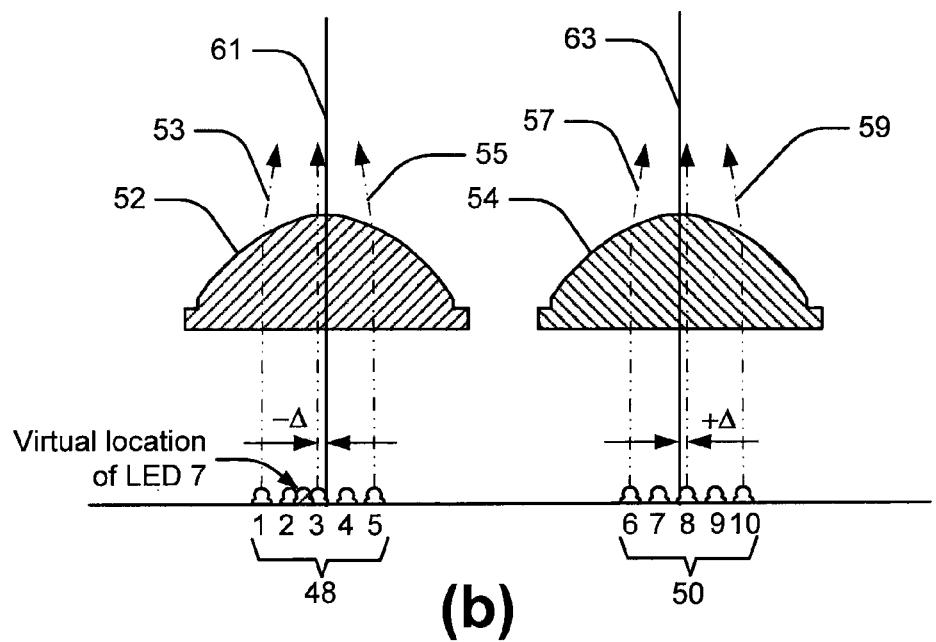

Referring now to FIG. 3, an exemplary headlight 18 that has features consistent with at least some aspects of the present invention is illustrated. Among other components, headlight 18 includes a steerable light assembly 40 that in turn includes, among other components, a first light module and a second light module 44. Referring also to FIG. 4(a), first light module 42 includes a bank 48 of five LEDs labeled 1, 2, 3, 4 and 5 which are mounted in a line to a PCB board 46 and an aspherical lens 52. LEDs 1-5 generate light which travels away from the mounting surface of PCB 46. Lens 52 is mounted adjacent board 46 such that light generated by LEDs 1-5 is directed through lens 52.

Figure 5:
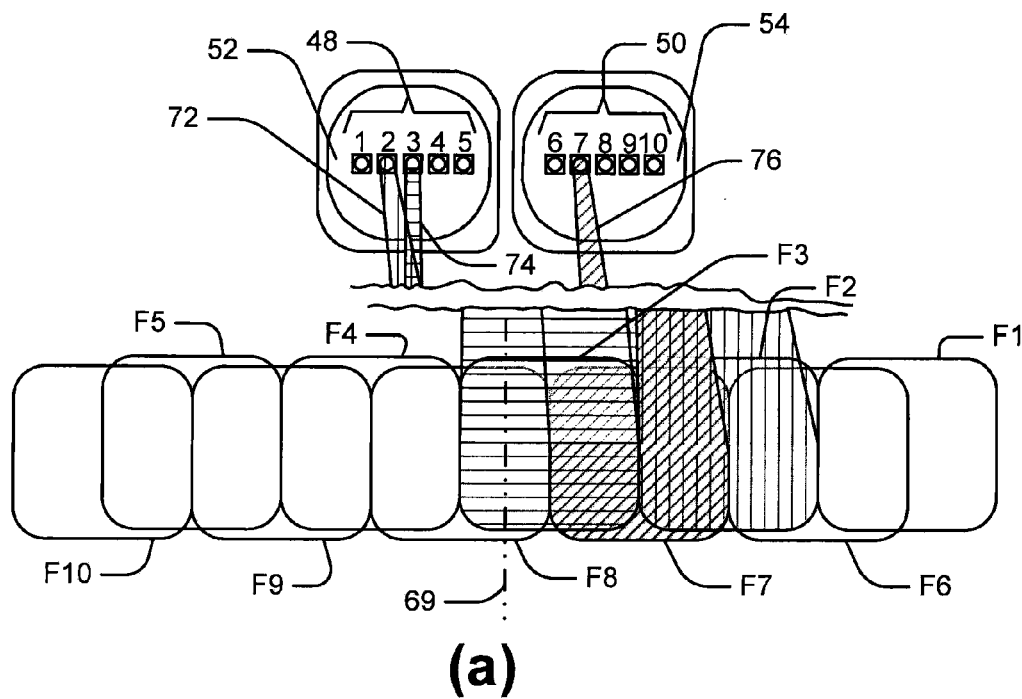
FIG. 5(a) is a schematic illustrating the exemplary light modules of FIG. 4 and illumination fields corresponding to each of the LEDs in the light modules and 5(b) is a graph illustrating an illumination pattern profile that may be generated by the light modules in FIG. 5(a)

Referring also to FIG. 4(b), a central axis through lens 52 is labeled 61. LEDs 1 through 5 are spaced apart minimally and form a line where LED 3 is central to the line. The LED bank 48 is offset by an offset distance −Δ to one side (e.g., left as illustrated in FIG. 4(b)) of central axis 61 where −Δ is approximately ¼ the distance between central axis (not labeled) through adjacent LEDs. Light from LEDs to either side of central LED 3 is redirected by lens 52 to travel along trajectories that pass generally through a central plane defined by central axis 61. To this end, see phantom light trajectories 54 and 55 corresponding to LEDs 1 and 5 that veers toward and eventually through the plane defined by axis 61. Light from central LED 3 is also redirectly, albeit slightly, so that at least a portion travels across central axis 61. Referring also to FIG. 5(a), the end result is that LEDs 1-5 generate adjacent illumination fields F1-F5 as illustrated, that form a first light pattern.

Referring still to FIGS. 4(a) and 4(b), second light module 44 includes a bank 50 of five LEDs labeled 6, 7, 8, 9, and 10 which are also mounted in a line to PCB board 46 and an aspherical lens 54. LEDs 6-10 generate light which travels away from the mounting surface of PCB 46. Lens 54 is mounted adjacent board 46 such that light generated by LEDs 6-10 is directed through lens 54. A central axis through lens 54 is labeled 63. LEDs 6-10 are spaced apart minimally and form a line where LED 8 is central to the line. The LED bank 50 is offset by an offset distance +Δ to one side (e.g., right is illustrated in FIG. 4(b)) of central axis 63 where +Δ is approximately ¼ the distance between central axis (not labeled) through adjacent LEDs. Light from LEDs to either side of central LED 8 is redirected by lens 54 to travel along trajectories that pass generally through a central plane defined by central axis 63. To this end, see the phantom light trajectories 57 and 59 corresponding LEDs 6 and 10, respectively, that veers toward and eventually through the plane defined by axis 63. Light from central LED 8 is also redirected, albeit slightly so that at least a portion travels across central axis 63. Referring also to FIG. 5(a), the end result is that LEDs 6-10 generate adjacent illumination fields F6-F10 as illustrated, that form a second light pattern.

Referring once again to FIG. 4(b), the slight offsets −Δ and +Δ result in an offset between the fields generated by the first and second banks of LEDs 48 and 50, respectively. More specifically, as shown in FIG. 5(a) where the +Δ and −Δ values are approximately ¼ the distance between central axis through adjacent LEDs, the offset is approximately ½ the width of one of the illumination fields. In FIG. 5(a), fields F1-F5 are shown vertically offset from fields F6-F10 in order to simplify this understanding. In practice, it at least some applications, fields F1-F5 are vertically aligned with fields F6-F10. As shown in FIG. 5(a), each space between adjacent fields corresponding to the first bank of LEDs 1-5 is illuminated by a field associated with one of the LEDs in bank 50 and, similarly, each space between fields associated with adjacent LEDs in bank 50 is illuminated by one of the illumination fields associated with one of the LEDs in bank 48 as the first and second light patterns combine to form a combined light pattern.

Referring still FIG. 5(a), it has been recognized that different subsets of the LEDs 1-10 can be energized to generate different overall light patterns within the space associated with fields F1-F10. More specifically, by exciting different subsets of LEDs 1-10, the pattern of light generated thereby can be effectively steered to the left or right or to the center. For instance, as shown in FIG. 5(a), when LEDs 2, 3 and 7 are illuminated (see projected light 72 (top-to-bottom hatch), 74 (left-to-right hatch) and 76 (cross-hatch)) while the other LEDs 1, 4-6 and 8-10 are off, only fields F2, F7 and F3 are illuminated and hence the resulting illumination pattern is offset to the right of a center line 69 as illustrated. See also FIG. 5(b) that shows illumination pattern resulting when LEDs 2, 3 and 7 are illuminated to a maximum level (i.e., at a 100% duty cycle) while the balance of LEDs in module 42 and 44 are turned off.

Pattern 80a is offset to the right of center line 69. Pattern 80a has a stepped profile because side portions of pattern 80a are only illuminated by light generated by one of the LEDs (e.g., either LED 2 or LED 3) while the center portion includes overlapping light generated by LED 7 and one or the other of LEDs 2 and 3. By changing which three of the LEDs 1-10 are on at any time, the resulting pattern 80a can be moved to the left or right as indicated by the phantom arrow 82 shown in FIG. 5(b). By stepping the on and off activity in a controlled fashion, movement of illumination pattern 80a can be controlled so that it has a relatively smooth appearance. For example, referring still to FIGS. 5(a) and 5(b), to move pattern 80a to the right, LED 3 may be turned off to darken field F3 at the same time that LED 6 is turned on to illuminate field F6. To move another step to the right, LED 7 may be turned off to darken field F7 while at the same time turning on LED 1 to illuminate field F1.

Referring still to FIG. 5(b), by providing a pattern 80a that has a lower intensity at the sides and a higher intensity at a middle portion, the resulting illumination pattern looks as though it is fading out or fading in at its edges as the pattern is moved from left to right or vice versa, thereby further enhancing the smooth moving affect observed by a person driving the vehicle 11.

Figure 6:
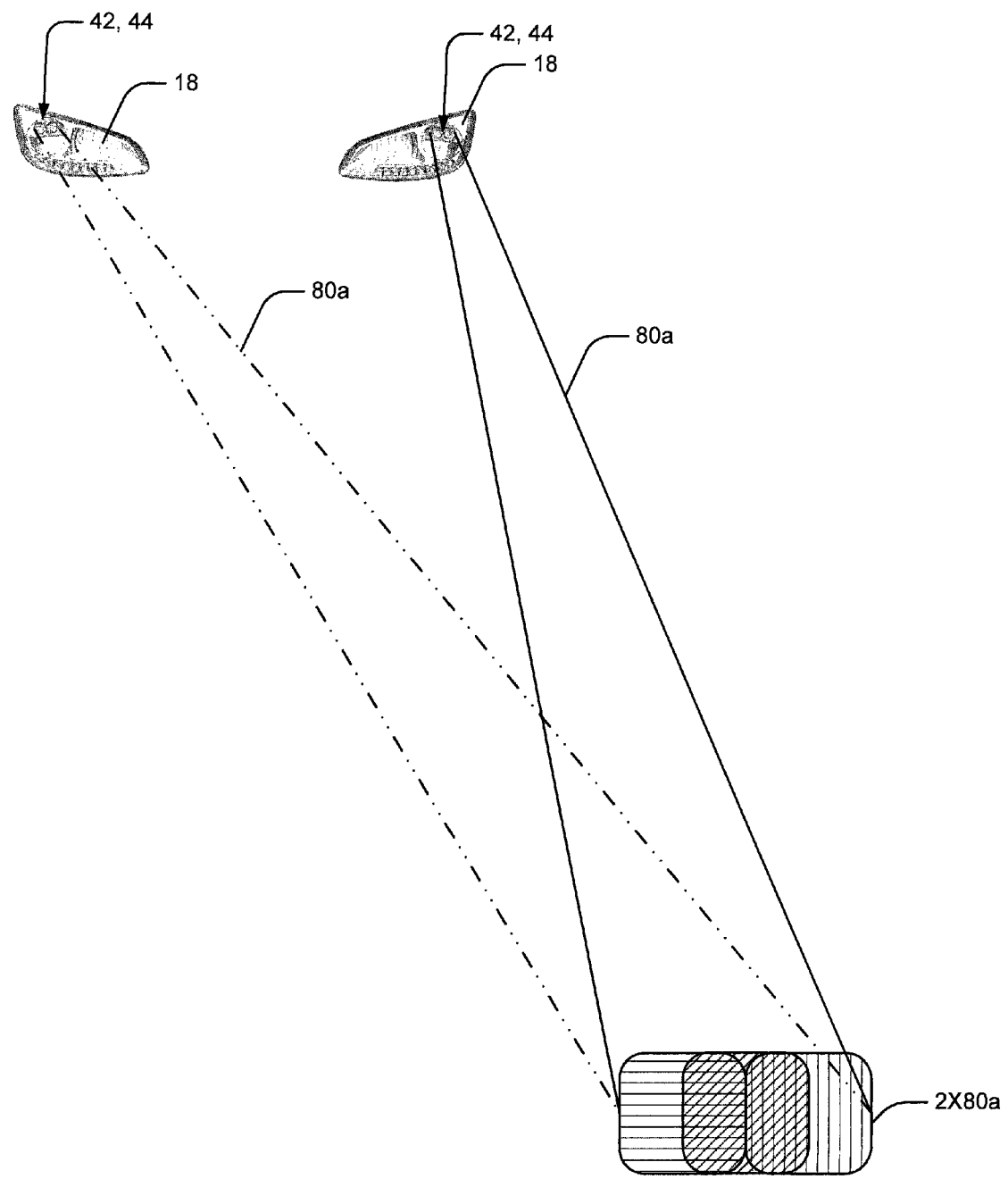
FIG. 6 is a schematic illustrating two headlights like the headlight shown in FIG. 3 and a resulting illumination pattern.

Referring now to FIG. 6, in at least some embodiments the light pattern 80a generated by a second headlight 18 is identical to and completely aligned with the light pattern 80a generated by the other headlight 18 such that the intensity of the combined pattern is twice the intensity of pattern 80a.

Figure 7:
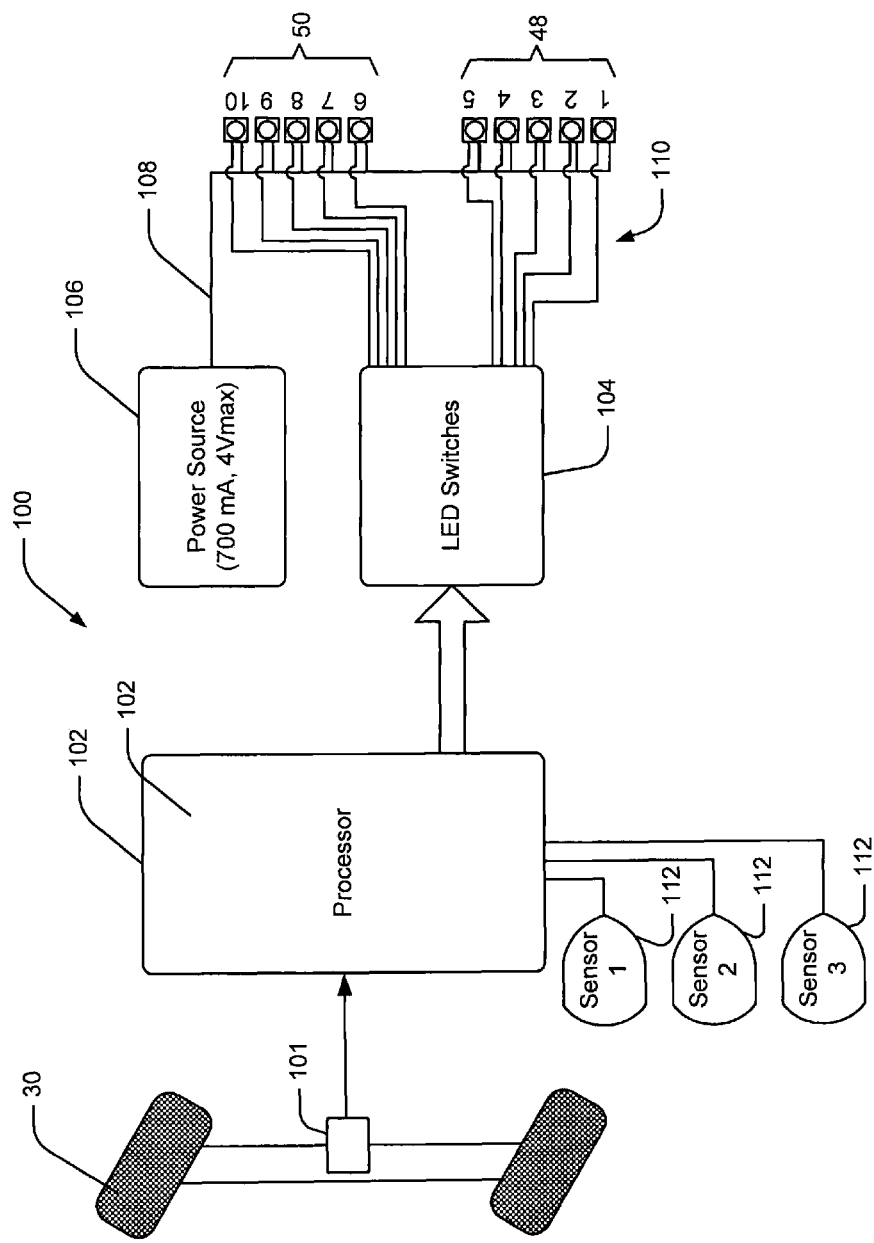
FIG. 7 is a schematic illustrating a control system for the LEDs in the light modules of FIG. 4.

Referring now to FIG. 7, a system 100 for controlling the first and second light banks 48 and 50, respectively, of one of the headlights 18 is illustrated. The system 100 includes a processor 102, a sensor 101, a power source 106, LED switches 104, a power bus 108 and switch lines collectively identified by numeral 110. Processor 102 performs various processes that are consistent with at least some aspects of the present invention. To this end, processor 102 is linked to sensor 101 as well as to LED switches 104. Sensor 101 is a steering sensor that, as the label implies, senses direction in which wheels 30 are headed. Sensor 101 generates a direction signal which is provided to processor 102.

Referring still to FIG. 7, power source 106 is, in the illustrated embodiment, a 700 milliamp, 4 volt max power source that provides voltage on bus 108. Bus 108 is connected to the anode of each of the LEDs 1-10. The LED switches block 104 includes 10 separate LED switches, each of the switches linked to a cathode of a separate one of the LEDs 1-10. Each switch in block 104 is linked to processor 102 such that the processor 102 can turn any subset of the switches on or off thereby providing power to an one or a subset of the LEDs 1-10.

Referring still to FIG. 7 and also again to FIGS. 5(a) and 5(b), in operation, as the driver of a vehicle turns a steering wheel to turn tires 30, the direction signal from sensor 101 is provided to processor 102. Processor 102 uses the direction signal to determine who the LEDs 1-10 should be energized to cause the resulting illumination pattern to be directed along the direction of travel of the vehicle. Processor 102 then controls switches 104 to cause the illumination pattern to steer accordingly. Again, because the patterns from the first and second LED banks 84 and 50 are interleaved, and because the pattern is less intense along side portions thereof as best shown in FIG. 5(b), as processor 102 controls the switches 104 to move the pattern left or right, the pattern appears to move relatively smoothly which has a nice visual appearance.

It has been recognized that, in addition interleaving illumination patterns from adjacent light modules and generating a light pattern that is less intense along side portions than in a central area, the illusion of smooth movement of a pattern can be enhanced by adjusting the duty cycles of LEDs during the light steering process. To this end, referring now to FIG. 8(a), modules 42 and 44 are again shown along with illumination fields F1-F10 corresponding to LEDs 1-10, respectively. In addition, a position slider icon 120 is shown along with a position value block 122, a first subset of LED duty cycle blocks 124 and a second subset of LED duty blocks 126. In the illustrated example, position slider icon 120 can be slid horizontally along the illustrated slider bar to any position from the left end to the right end as illustrated and represents the control command from sensor 101 (see again FIG. 7) indicating the direction in which the steering tires 20 of a vehicle 11 (see again FIG. 2) are pointed and hence the direction in which the lighting pattern generated by the LEDs 1-10 should be directed.

In the illustrated example, the range of positions is between a zero position at the left of the slider bar as illustrated and an 8 position at the right of the slider bar. Block 122 indicates a current position of the position slider icon 120 and in the illustrated example shown in FIG. 8(a), the current position is 2.29 (out of 8). The first duty cycle block 124 includes five duty cycles boxes, a separate box for each one of the LEDs 1-5 in the first LED bank 48. Each duty cycle box is labeled with a number that corresponds to an associated one of the LEDs 105. Thus, a second box which is labeled 2 corresponds to the LED labeled 2 in bank 48, the third box which is labeled 3 corresponds to the LED labeled 3 in bank 48, etc. Each duty cycle box includes a percentage value between 0% and 100% and indicates the duty cycle used to drive an associated LED when the position shown by slider 120 and indicated in block 122 is selected. Thus, for instance, duty cycle box 2 includes a 71% duty cycle in FIG. 8(a) indicating that associated LED 2 is driven with a 71% duty cycle when position 2.29 is selected. Similarly, duty cycle box 3 includes a 29% duty cycle indicating that LED 3 in driven with a 29% duty cycle when position 2.29 is selected. As shown, when position 2.29 is selected, in the illustrated example, LEDs 1, 4 and 5 are completely off because duty cycles boxes 1, 4 and 5 have a zero percent value.

The second subset 126 of LED duty cycle blocks include boxes 6-10 corresponding to LEDs 6-10, respectively, in LED bank 50. Each duty cycle box 6-10 indicates the duty cycle used to drive an associated one of the LEDs 6-10 in LED bank 50 given the position indicated by icon 120 and block 122. In the illustrated example, duty cycle box 7 indicates a 100% duty cycle meaning that LED 7 is driven to a maximum intensity while boxes 6, 8, 9 and 10 indicated that the associated LEDs 6, 8, 9 and 10 are off when position 2.29 is selected. Duty cycles are controlled by PWM switching by processor 102 as well known in the art.

Referring still to FIG. 8(a), as in FIG. 5(a) above, when LEDs 2, 3 and 7 are illuminated, the resulting illumination fields F2, F3 and F7 are generated where fields F2 and F3 are adjacent each other and field F7 is directed toward a space centered on the dark space between fields F2 and F3 so that field F7 generally equally overlaps fields F2 and F3. Here, because each of the LEDs 2, 3 and 7 is driven with a different duty cycle, each of the separate fields has a different intensity. In the illustrate example, consistent with the description of the first and second subsets of duty cycle blocks above, fields F2, F3 and F7 have intensity values of 71%, 29% and 100%, respectively. Because fields F2, F3 and F7 overlap as shown, the combined intensities result in four different intensity areas across the width of the illumination pattern. In this regard, see FIG. 8(b) where profile 80b of the illumination pattern is shown. Referring to FIGS. 8(a) and (b), the illumination pattern 80b has a 29% intensity value in the lateral left quarter (i.e. in a first edge illumination field), 129% intensity value in the center left quarter (i.e., the combination of the 29% intensity from LED 3 and 100% intensity from LED 7), a 171% intensity value in the center right quarter (i.e., the 71% intensity value from LED 2 combined with the 100% intensity value from LED 7), and a 71% intensity value in the lateral right quarter (i.e., in a second edge illumination field). Thus, the resulting illumination pattern 80b, while still relatively intense in a center area, fades off along lateral edges more appreciably than pattern 80a shown in FIG. 5(b) where LEDs are simply on or off.

Figure 8:
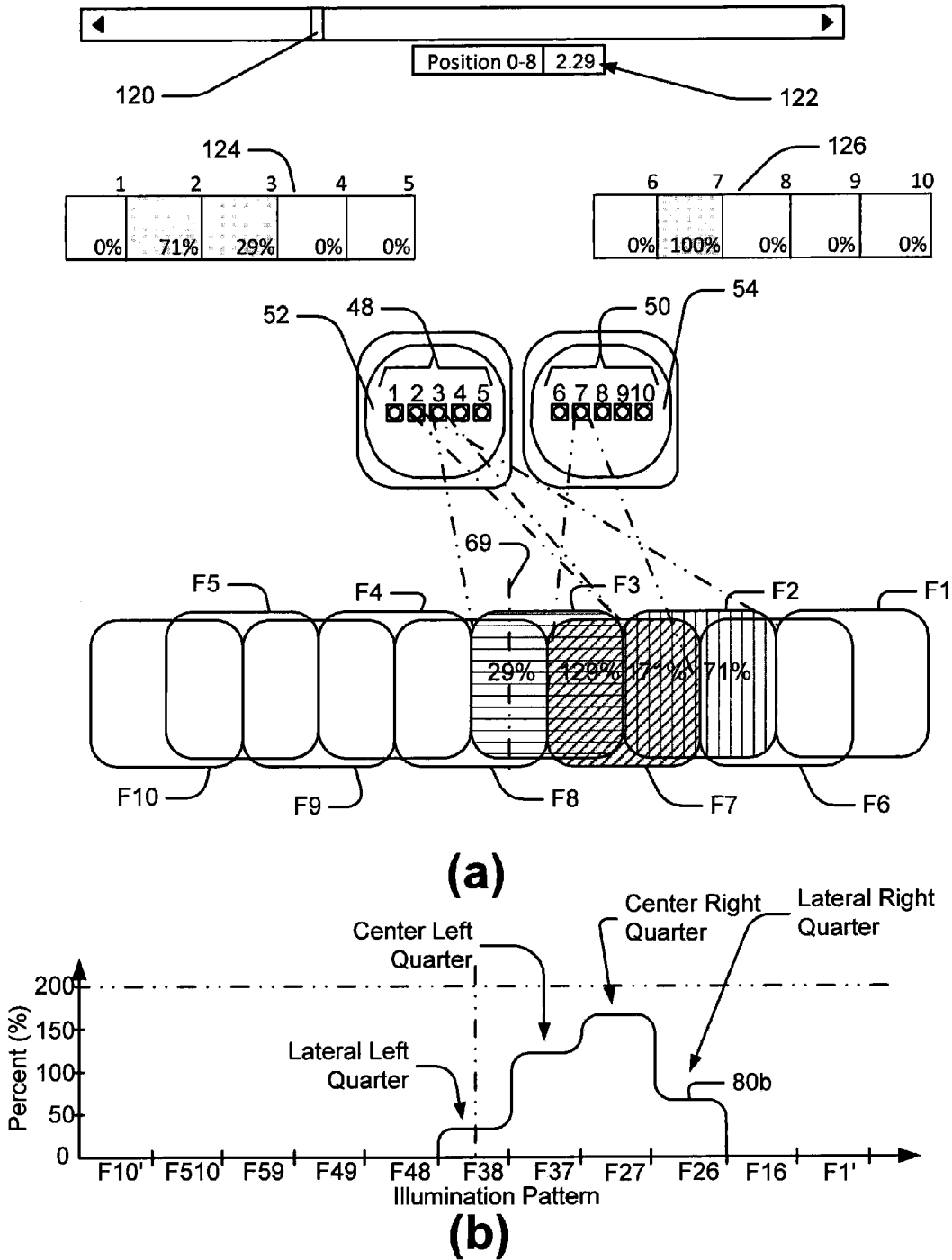
FIG. 8(a) is a schematic illustrating illumination pattern position indicators as well as LED duty cycle boxes and resulting illumination fields where the illumination pattern position is set to position 2.29 within a range between zero and eight
FIG. 8(b) is a graph illustrating an illumination pattern profile that results from the duty cycle shown in FIG. 8(a)

Referring still to FIG. 8(a) as the position indicated in block 122 is changed, the duty cycles corresponding to LEDs 1-10 are also changed. In general, in the present example, at any position within the range between positions 0 and 8, either one LED in each of LED banks 48 and 50 is driven at a 100% duty cycle or one of the LEDs in one of the banks 48 and 50 is driven within a 100% duty cycle while two of the LEDs in the other of the banks 48 and 50 are driven with partial duty cycles where the partial duty cycles add up to a 100% duty cycle. Thus, for instance, as shown in FIG. 8(*a*), at position 2.29, LED 7 in bank 50 is driven with a 100% duty cycle while LEDs 2 and 3 in bank 48 are driven with 71% and 29% duty cycles, respectively, that combine to yield a 100% value. As the position indicated by block 122 moves toward a position 3, the duty cycle in duty cycle box 2 decreases toward zero (i.e., fades off) while the duty cycle in duty cycle box 3 increases toward 100% (i.e., fades on) until, at position 3, each of LEDs 3 and 7 had a 100% duty cycle while the other LEDs are off. Continuing, if the position is further moved toward a position 4, LED 3 in driven with 100% duty cycle while the duty cycle of LED 7 is reduced toward a zero value and the duty cycle of LED 8 is increased towards a 100% value. This process of changing LED duty cycles to steer or swivel the resulting illumination pattern in front of a vehicle continues along the range of positions.

Figure 9:
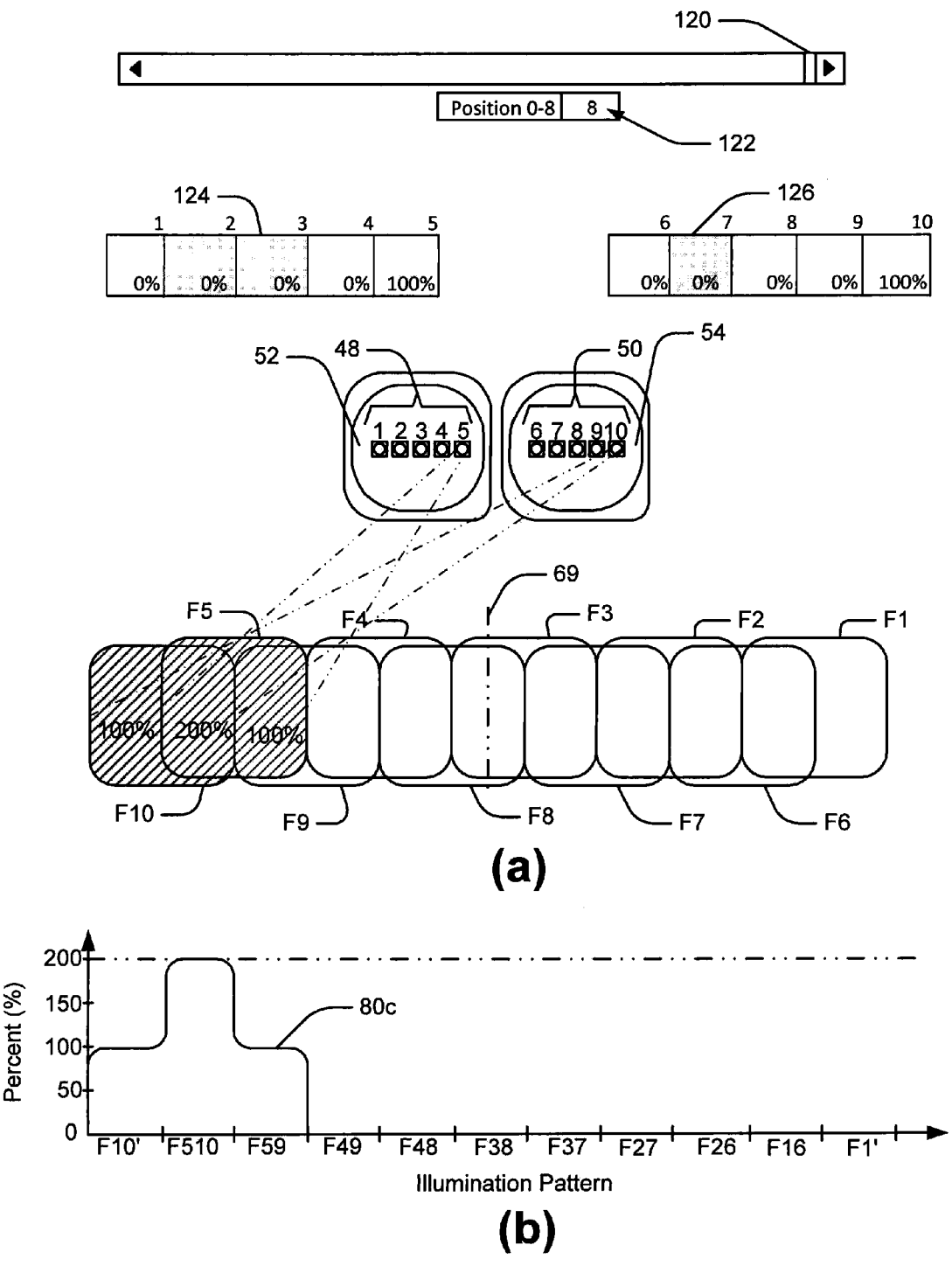
FIGS. 9(a) and 9(b) are similar to FIGS. 8(a) and 8(b), albeit with the illumination pattern position set to position 8.

Referring now to FIG. 9(*a*), the position slider icon 120 is shown at position 8 (see also block 122) at the right end of the range and the duty cycle boxes 1-10 indicate that LEDs 5 and 10 have a 100% duty cycle while the other LEDs are off. FIG. 9(*b*) shows the resulting illumination pattern profile 80*c* which is shown to the far left and which has a symmetrical pattern along its width.

Figure 10:
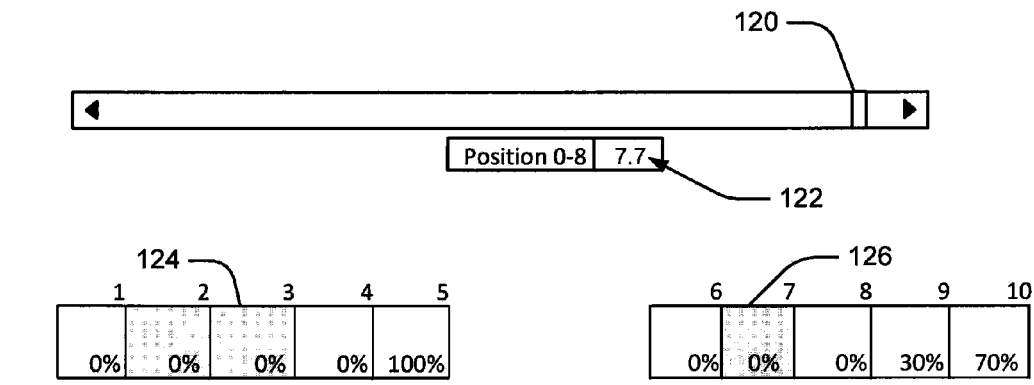
FIGS. 10(a) and 10(b) are similar to FIGS. 8(a) and 8(b), albeit with the illumination pattern position set to position 7.7.
Figure 10:
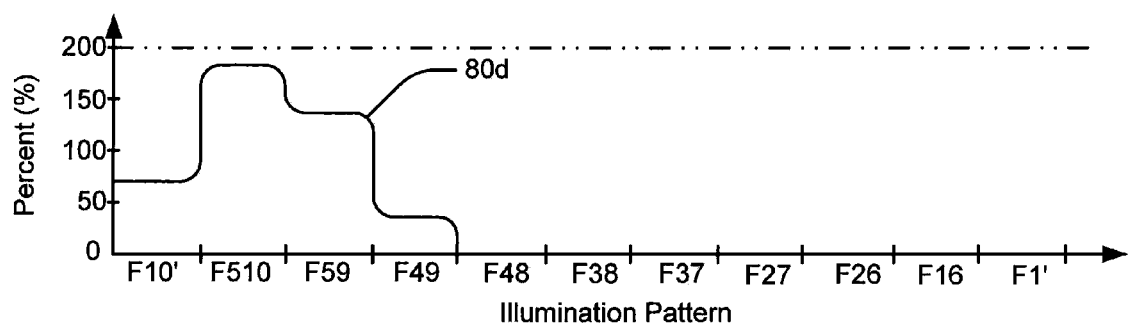

Referring to FIG. 10(*a*), as the position slider icon 120 moves from right to left, eventually the icon reaches a position 7.7 (see also block 122). At this point, boxes 1-10 indicate that LED 5 is driven with 100% duty cycle and LEDs 9 and 10 are driven with 30% and 70% duty cycles, respectively, while the balance of the LEDs are off. Referring also to FIG. 10(*b*), illumination pattern profile 80*d* results. Comparing the patterns in FIGS. 9(*b*) and 10(*b*), it should be appreciated that as the position changes from position 8 to position 7.7 the pattern starts to move from left to right as illustrated. More specifically, the intensity of a left portion of the profile decreases to fade out while the intensity of the right portion of the profile of 80*d* increases and effectively fades on.

Figure 11:
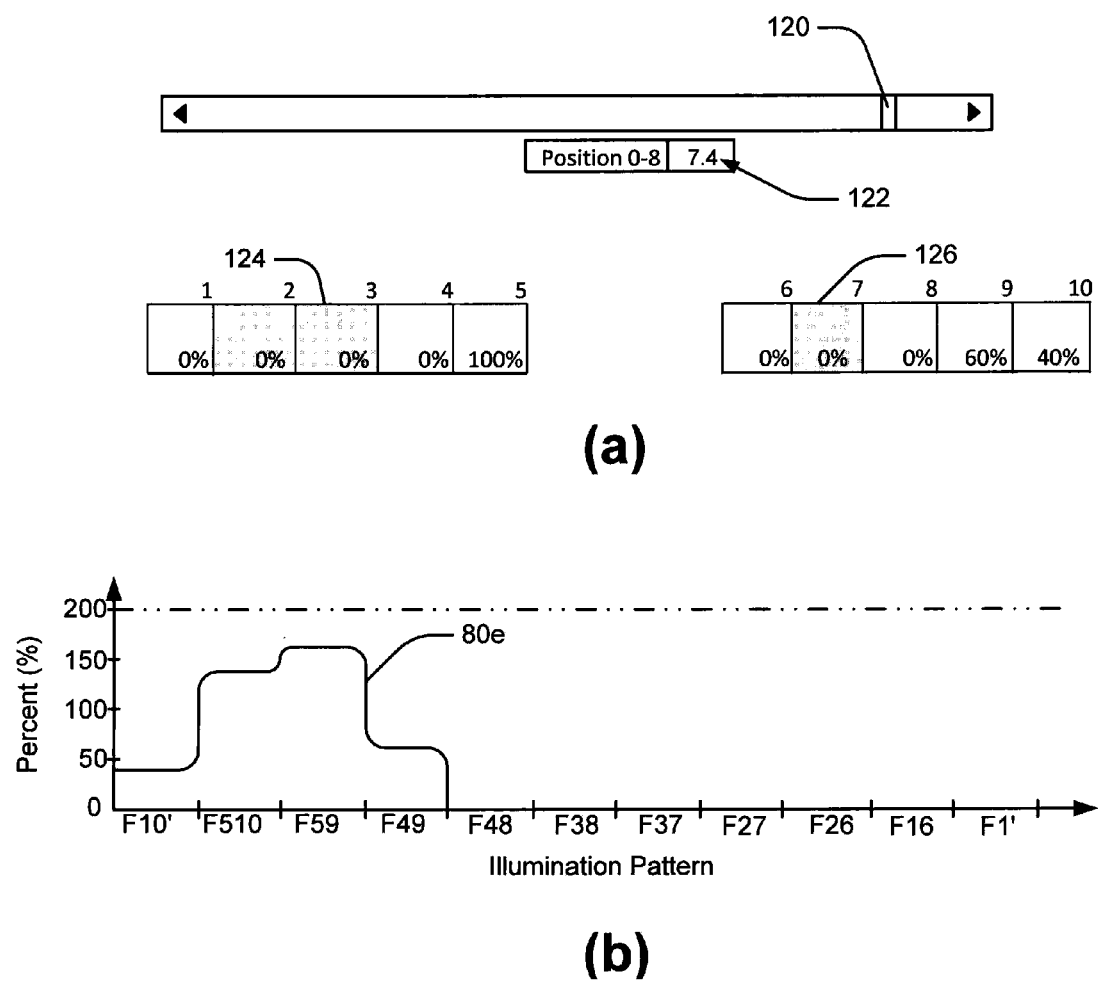
FIGS. 11(a) and 11(b) are similar to FIGS. 8(a) and 8(b), albeit with the illumination pattern position set to position 7.4.

Referring now to FIG. 11(*a*) position slider icon 120 has been moved further to the left to a position 7.4 (see also block 122). In this position, LED 5 is still driven with a 100% duty cycle while LEDs 9 and 10 are now driven with 60% and 40% duty cycles, respectively. Illumination pattern profile 80*e* results as shown in FIG. 11(*b*). Comparing the pattern profiles 80*d* and 80*e* in FIGS. 10(*b*) and 11(*b*), it can be seen that the left portion of the pattern continues to decrease in intensity while the right portion of the pattern continues to increase in intensity further causing the pattern to appear to move in a smooth fashion from left to right as illustrated.

Figure 12:
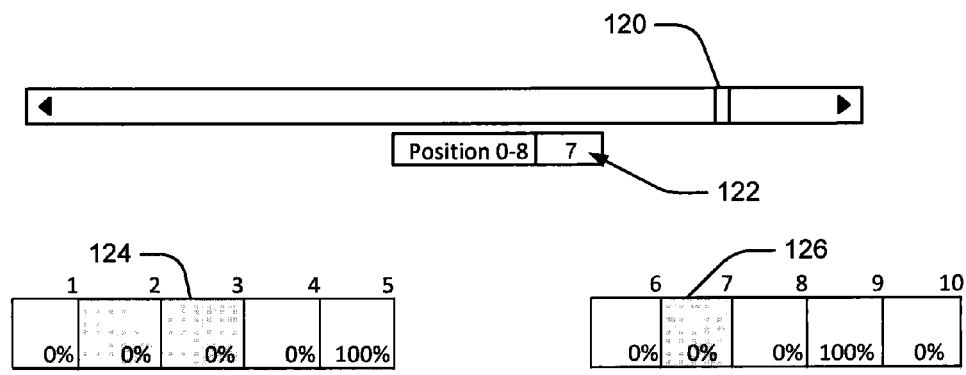
FIGS. 12(a) and 12(b) are similar to FIGS. 8(a) and 8(b), albeit with the illumination pattern position set to position 7.0.
Figure 12:
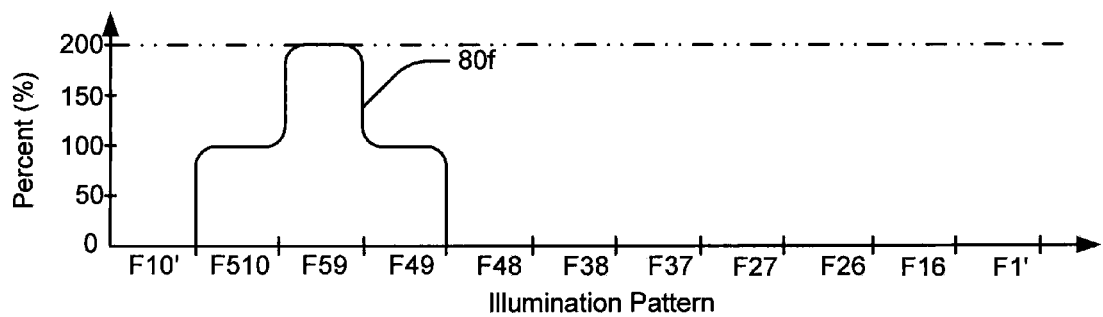

Referring now to FIG. 12(*a*), position icon 120 has been moved to position 7, (see again block 122). At this point, LEDs 5 and 9 are driven with 100% duty cycle while the balance of the LEDs are off. The illumination pattern profile 80*f* that results in shown in FIG. 12(*b*). Comparing the profiles 80*c* and 80*f* in FIGS. 9(*b*) and 12(*b*), it should be appreciated that profile 80*c* has moved from left to right as the position has moved from position 8 to position 7. With the iterative pattern profiles as shown in FIGS. 10(*b*) and 11(*b*) and many other iterative patterns therebetween, the transition from profile 80*c* to profile 80*f* appears to be smooth and gradual to the human eye.

Figure 13:
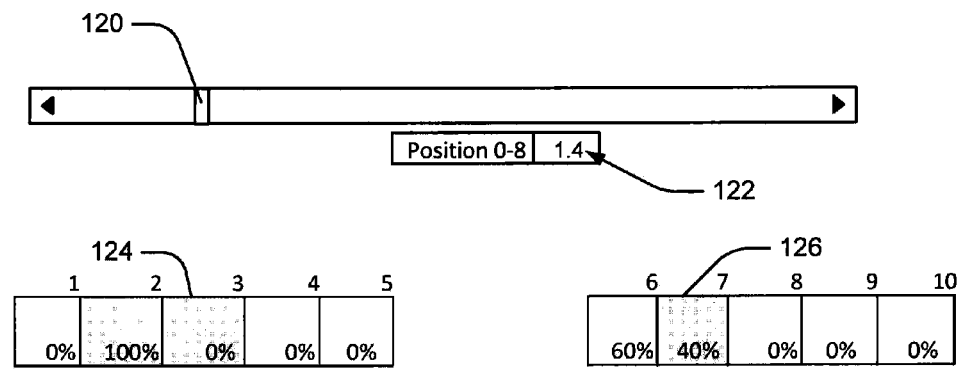
FIGS. 13(a) and 13(b) are similar to FIGS. 8(a) and 8(b), albeit with the illumination pattern position set to position 1.4.
Figure 13:
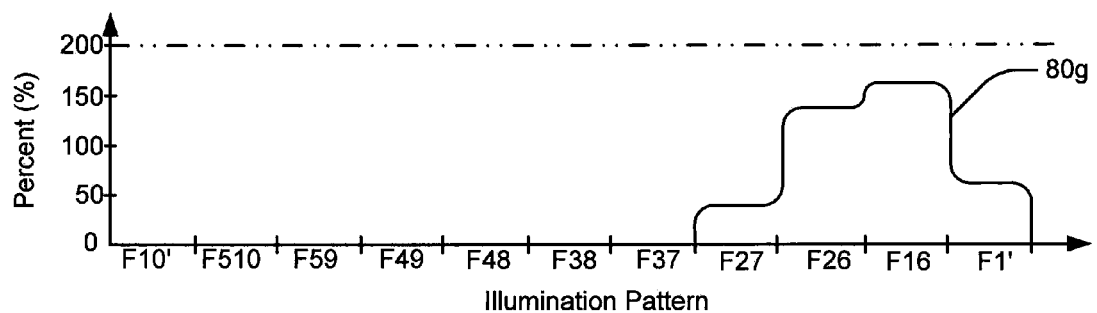
Figure 14:
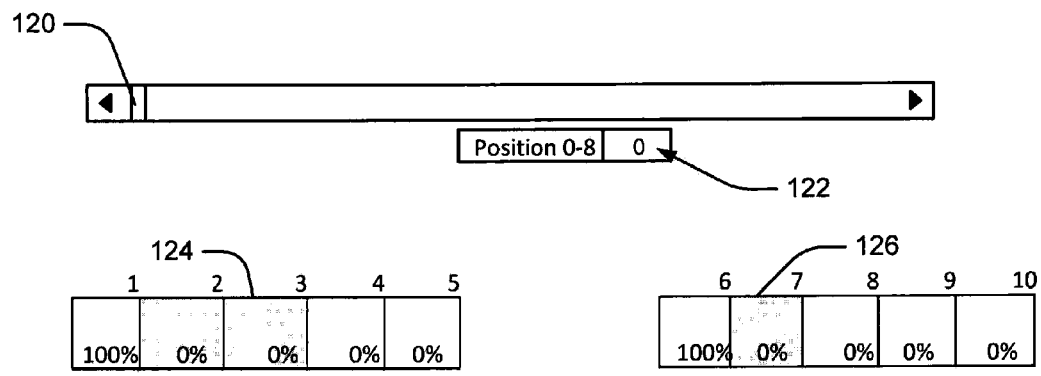
FIGS. 14(a) and 14(b) are similar to FIGS. 8(a) and 8(b), albeit with the illumination pattern position set to position 0.
Figure 14:
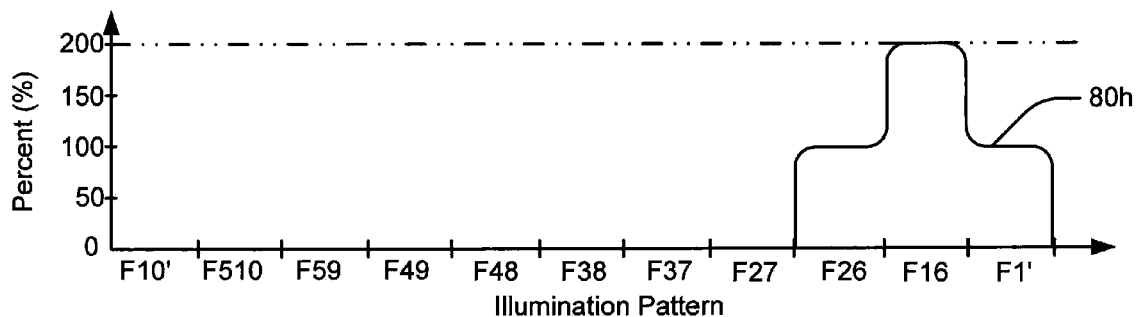

As the position is decreased from position 7, the pattern profiles generated by LEDs 1-10 are modified in a fashion similar to that described above thereby causing the pattern to effectively move in front of a vehicle from one side to the other. As described above, and referring again to FIGS. 8(*a*) and 8(*b*), eventually as a position value decreases, position 2.29 is reached where LEDs 2, 3 and 7 are driven with duty cycles of 71%, 29% and 100%, respectively, and illumination profile 80*b* results. FIGS. 13(*a*) and 13(*b*) show LED duty cycles and the resulting illumination pattern profile 80*g* at position 1.4 where the pattern profile 80*g* is far to the right. Eventually, at position zero, the duty cycles and pattern profile 80*h* shown in FIGS. 14(*a*) and 14(*b*) occur.

Figure 15:
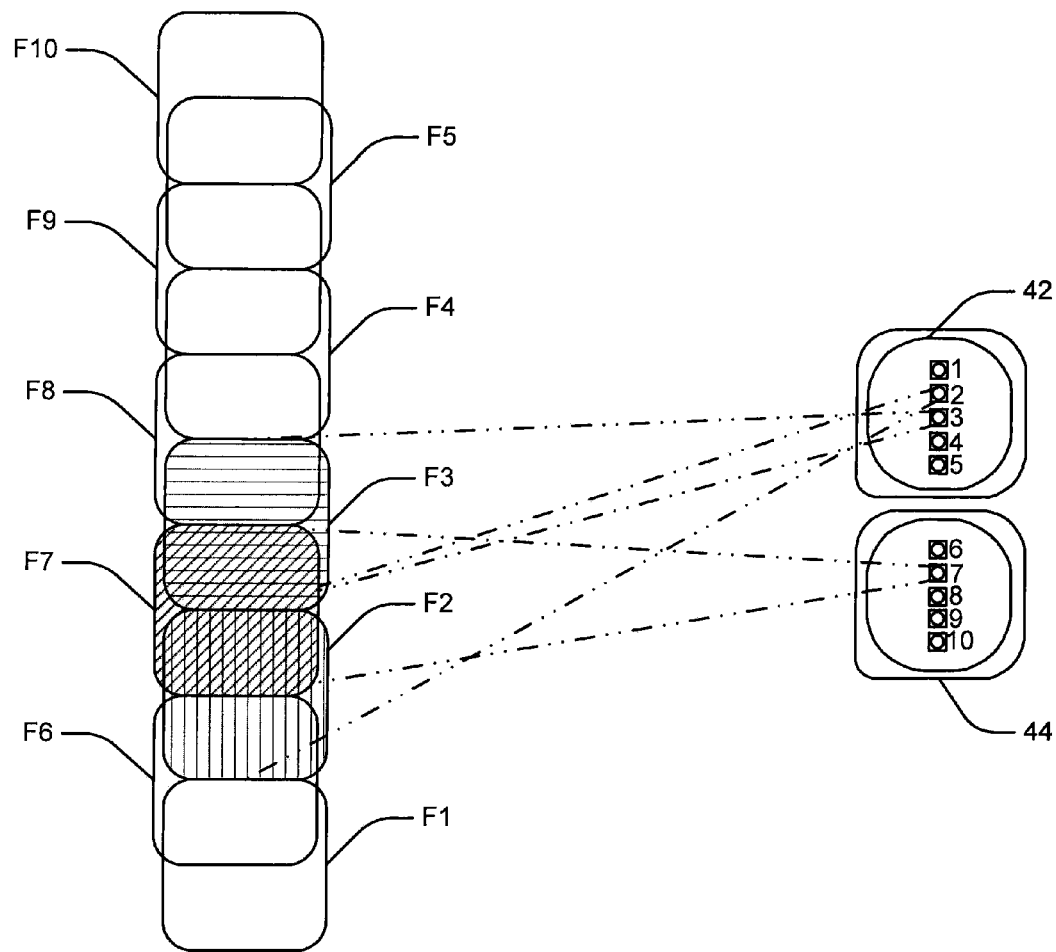
FIG. 15 is similar to FIG. 8(a), albeit showing light modules arranged vertically and resulting illumination fields.

While the lighting system described above is described in the context of vehicle headlights, it should be appreciated that various aspects of the embodiment may be used in other lighting systems to achieve similar useful results. For example, a lighting system consistent with various aspects of the system described above may be used in conjunction with a lift truck or the like to provide light that can be steered to different positions along a vertical direction as opposed to a horizontal direction. In this regard, see FIG. 15 that shows first and second light modules 42 and 44 arranged with module 42 vertically above module 44 where the LEDs 1-5 and 6-10 are arranged to form vertical lines. Here, as shown, the modules 42 and 44 are arranged such that the illumination fields F1-F10, respectively, corresponding LEDs 1-10 are interleaved in a fashion similar to that described above so that the dark space between fields generated by any two adjacent LEDs in one of the modules is illuminated by one of the LEDs in the other of the modules so that no abrupt changes in intensity occur across the resulting illumination pattern profile. In the illustrated example in FIG. 15, field F7 is generated which overlaps fields F2 and F3 when LEDs 2, 3 and 7 are on. In addition, as above, in at least some embodiments it is contemplated that as the direction of the illumination pattern generated by the LEDs 1-10 is changed, the duty cycles of the LEDs may be modified so that movement of the illumination pattern appears to be smooth between the various positions.

It has been recognized that, in addition to being able to generate a single steerable illumination pattern, the system described above may also be used to generate a relatively wide bright illumination pattern with a dark spot where the dark spot is movable to different positions within the wider illumination pattern range in an adaptive fashion. For example, it may be that a wide bright illumination pattern is desirable in front of a vehicle but that the portion of the wide bright pattern directed toward an oncoming vehicle should be less intense or off. To this end, see FIG. 16(*a*) where a wide light profile is illustrated which includes a dark space between profile portions 80*i*1 and 80*i*2. Here, by adjusting LED duty cycles or on and off cycling in a controlled fashion, the dark spot between profile portions 80*i*1 and 80*i*2 can be moved left and/or right and/or its width can be increased or decreased as appropriate.

Figure 16:
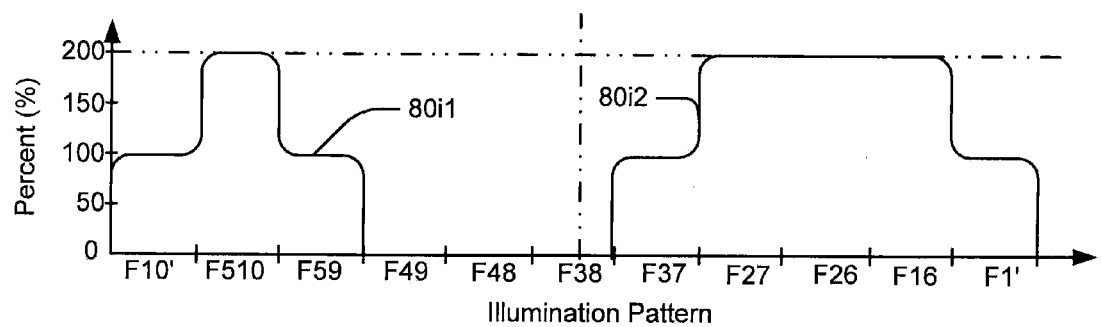
FIG. 16(a) is a graph illustrating an exemplary wide illumination pattern profile with a dark spot formed by the profile where the dark spot can be steered within the wider illumination pattern and FIG. 16(b) shows a wide bright illumination pattern similar to FIG. 16(a) albeit without a dark spot.
Figure 16:
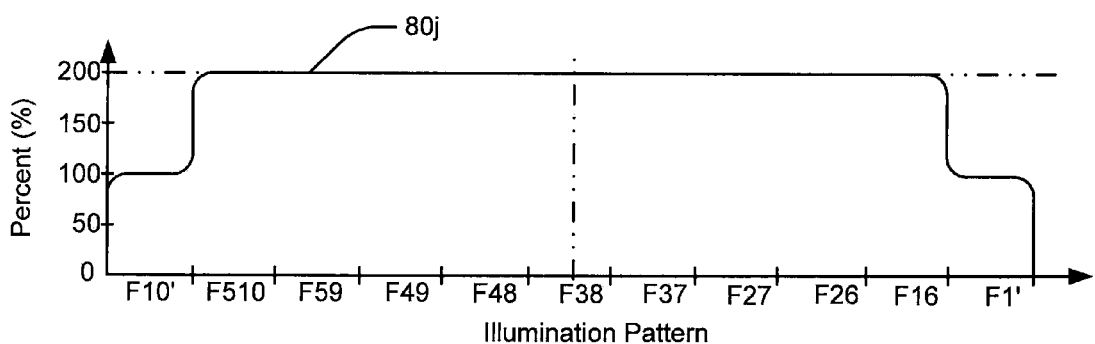

Referring again to FIG. 7, in at least some embodiments, to sense on coming vehicles, additional sensors 112 of various types may be provided. For example, at least one of the sensors 112 may be a two dimensional CCD or other camera sensor for obtaining images of the space in front of a vehicle that are provided to processor 102. Processor 102 may be programmed to analyze obtained images and identify vehicles within the camera's field of view. Based on the locations of vehicles in the on-coming traffic, processor 102 may then control the LEDs 1-10 to adjust the position of the dark spot or to adjust positions of multiple dark spots within the wider bright illumination pattern. When no on-coming traffic is sensed, as shown in FIG. 16(*b*), a wide bright illumination pattern 80*j* may be generated by processor 102 where all LEDs 1-10 are completely on.

Figure 17:
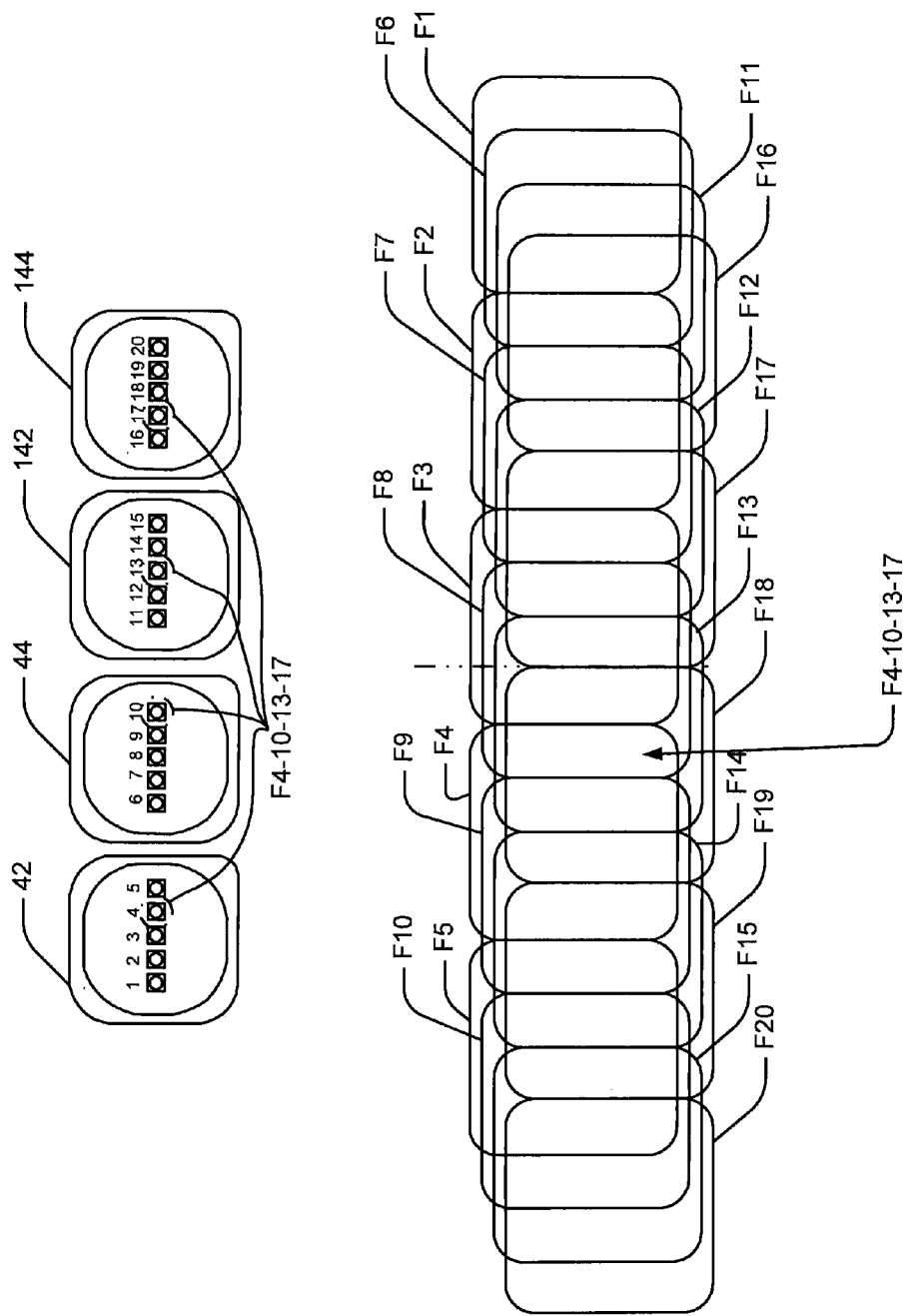
FIG. 17 is a schematic diagram similar to FIG. 5(a), albeit showing four light modules arranged in a horizontal line and resulting illumination fields.

While the systems described above include only two light modules 42 and 44, it should be appreciated that other embodiments may include three or more light modules to further increase the intensity of the illumination patterns generated and/or to further increase the ability to generate relatively smooth light patterns and enhance the illusion of smooth steering of the resulting pattern. To this end, see FIG. 17 where four light modules 42, 44 1042 and 144 are shown arranged in a line and where resulting overlapping illumination fields F1-F20 result. Here, processor 102 (see again FIG. 7) would be controlled to change the on and off duty cycles of the various LEDs 1-20 in a controlled fashion to generate desired illumination pattern profiles where a pattern profile is steerable or where a dark spot generated by a pattern profile is steerable in a fashion similar to that described above.

Figure 18:
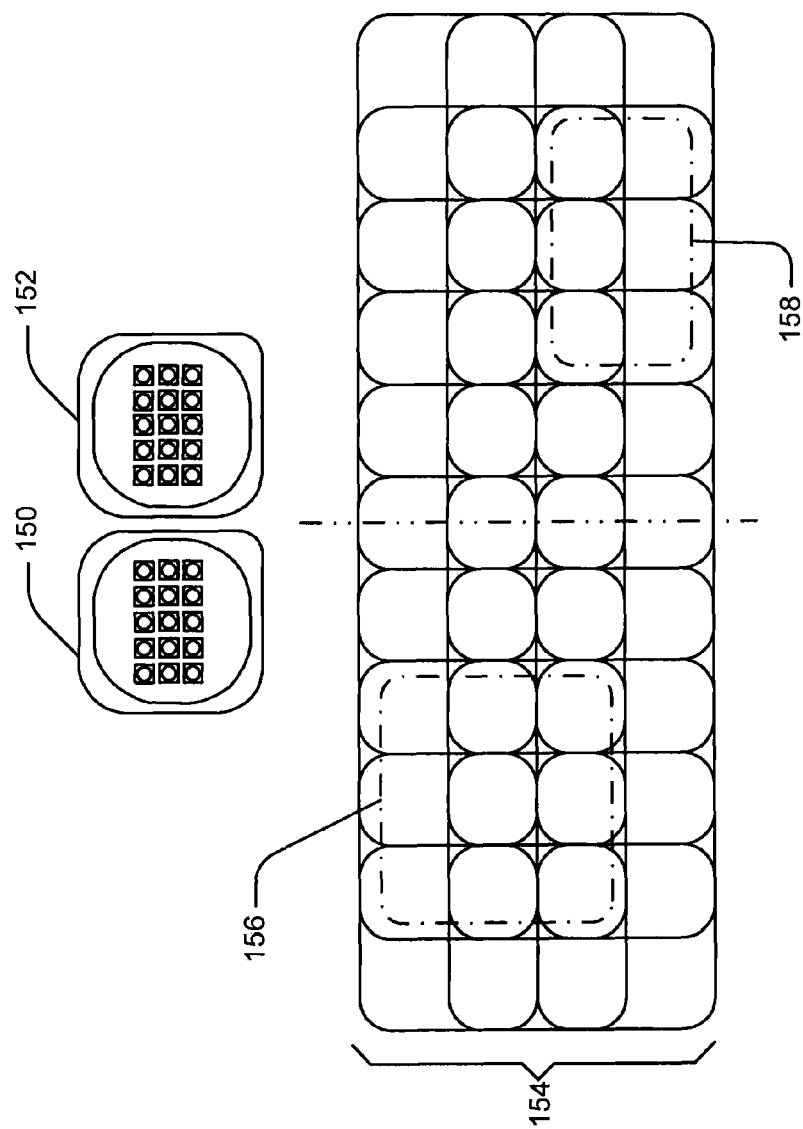
FIG. 18 is a schematic diagram illustrating first and second light modules and resulting fields where each light module includes three rows of five LEDs.

While each of the light modules (e.g., 42) described above includes a single line of LEDs, in other embodiments modules with multiple rows of LEDs are contemplated so that a resulting illumination pattern profile can be steered both vertically and horizontally to at least some degree. In this regard see FIG. 18 where modules 150 and 152 each have three rows of five LEDs so that resulting illumination fields can have vertical as well as horizontal offsets as shown at 154. Here, the shapes of the lenses (not labeled) through which LED light travels may have to be modified so that the fields align appropriately. In FIG. 18 exemplary illumination patterns are shown in phantom at 156 and 158 where pattern 156 is generated in an upper left-hand location within space 154 while pattern 158 is smaller than pattern 156 and is generated in a lower right-hand space of 154.

One or more specific embodiments of the present invention have been described above. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Thus, the invention is to cover all modifications, equivalents, and alternatives falling within the spirit and scope of the invention as defined by the following appended claims.

To apprise the public of the scope of this invention, the following claims are made:

What is claimed is:

1. A method for smoothly moving a light pattern across a space, the method for use with a plurality of LEDs mounted in a line and at least a first lens positioned in front of the LEDs to direct light from each LED into an illumination field associated with the LED wherein the illumination fields of energized LEDs together create an illumination pattern and wherein a first edge illumination field is at one end of the illumination pattern and a second edge illumination field is at another end of the illumination pattern opposite the one end, the method comprising the steps of:

providing a processor programmed to perform the steps of:
controlling LED duty cycles to move the illumination pattern projected by the at least a first lens in a first direction to the side of the first edge illumination field opposite the second edge illumination field by:
(i) increasing a duty cycle of an LED associated with the first edge illumination field while simultaneously decreasing a duty cycle of an LED associated with the second edge illumination field until the duty cycles of the LEDs associated with the first and second edge illumination fields are maximum and minimum duty cycles, respectively; and
(ii) repeating step (i) with the illumination field adjacent the first edge illumination field in the first direction as the first edge illumination field and with the illumination field adjacent the second edge illumination field in the first direction as the second edge illumination field.

2. The method of claim 1 further including the processor receiving a control signal and using the control signal for controlling the LED duty cycles to move the illumination pattern projected by the at least a first lens.

3. The method of claim 1 wherein the plurality of LEDs comprises at least three LEDs and wherein no more than three LEDs in the plurality of LEDs are on at one time.

4. The method of claim 1 further including the processor receiving a control signal and using the control signal for controlling the LED duty cycles to adjust the direction of the illumination pattern emanating from the at least a first lens.

5. The method of claim 1 further including the processor controlling the LED duty cycles via a pulse width modulation process.

6. The method of claim 1 further including driving at least one of the plurality of LEDs at a maximum intensity at all times.

7. The method of claim 1 wherein the plurality of LEDs is a first assembly and the illumination pattern is a first illumination pattern and where the first assembly is for use with a second assembly to form a pair of headlights on a vehicle wherein the second assembly generates a second illumination pattern that mirrors the first illumination pattern, the first and second assemblies arranged so that the first and second illumination patterns are substantially aligned and combine to generate a headlight pattern.

8. The method of claim 1 wherein the plurality of LEDs and the at least a first lens mounted in front of the LEDs are substantially horizontal and form a headlight for a vehicle.

9. The method of claim 1 wherein the plurality of LEDs and the at least a first lens mounted in front of the LEDs are substantially vertical and form a light for use on a lift truck.

10. The method of claim 1 wherein the plurality of LEDs include first through fifth LEDs and wherein the processor controls the intensities of each LED.

11. The method of claim 1 wherein the maximum and minimum duty cycles are 100% and 0% duty cycles.

12. The method of claim 1 further including driving at least one of the plurality of LEDs with 100% duty cycle at any time.

13. The method of claim 1 wherein the plurality of LEDs comprises at least three LEDs and wherein only three LEDs in the plurality of LEDs are driven at a non-zero duty cycle at any time.

14. The method of claim 1 wherein the processor is also for controlling the LED duty cycles to move the illumination pattern projected by the lens in a second direction to the side of the second edge illumination field opposite the first edge illumination field by:
(iii) increasing the duty cycle of an LED associated with the second edge illumination field while simultaneously decreasing the duty cycle of an LED associated with the first edge illumination field until the duty cycles of the LEDs associated with the second and first edge illumination fields are maximum and minimum duty cycles, respectively; and
(iv) repeating step (iii) with the illumination field adjacent the second edge illumination field in the second direction as the second edge illumination field and with the illumination field adjacent the first edge illumination field in the second direction as the first edge illumination field.

15. The method of claim 1 wherein the plurality of LEDs includes first and second banks of LEDs arranged in a line and wherein the at least a first lens includes first and second lenses where the first lens is positioned in front of the first bank of LEDs to direct light from each LED in the first bank into an illumination field associated with the LED and the second lens is positioned in front of the second bank of LEDs to direct light from each LED in the second bank into an illumination field associated with the LED wherein the illumination fields of energized LEDs in the first and second banks together create the illumination pattern and wherein a separate illumination field associated with the first bank LEDs overlaps each two adjacent illumination fields associated with the second bank while a separate illumination field associated with the second bank LEDs overlaps each two adjacent illumination fields associated with the first bank.

16. The method of claim 15 wherein no more than two LEDs in the first and second LED banks are driven at partial duty cycles at one time.

* * * * *